(12) United States Patent
Takagi

(10) Patent No.: US 8,629,918 B2
(45) Date of Patent: Jan. 14, 2014

(54) IMAGE PROCESSING APPARATUS, IMAGE PROCESSING METHOD AND PROGRAM

(75) Inventor: Yoshinori Takagi, Kanagawa (JP)

(73) Assignee: Sony Corporation, Tokyo (JP)

( * ) Notice: Subject to any disclaimer, the term of this patent is extended or adjusted under 35 U.S.C. 154(b) by 413 days.

(21) Appl. No.: 13/115,471

(22) Filed: May 25, 2011

(65) Prior Publication Data

US 2011/0221927 A1 Sep. 15, 2011

(30) Foreign Application Priority Data

Jun. 1, 2010 (JP) .............................. P2010-126020

(51) Int. Cl.
*H04N 5/228* (2006.01)
*H04N 5/225* (2006.01)

(52) U.S. Cl.
USPC ............... 348/222.1; 348/169; 348/231.1; 726/106

(58) Field of Classification Search
USPC ............ 348/169, 222.1, 231.1, 231.2, E5.031
See application file for complete search history.

(56) References Cited

U.S. PATENT DOCUMENTS

| | | | | |
|---|---|---|---|---|
| 4,005,385 A | * | 1/1977 | Joynson et al. | 382/199 |
| 5,806,072 A | * | 9/1998 | Kuba et al. | 1/1 |
| 7,394,916 B2 | * | 7/2008 | Brodsky et al. | 382/103 |
| 2007/0162873 A1 | * | 7/2007 | Haro et al. | 715/838 |
| 2007/0220431 A1 | | 9/2007 | Nakamura et al. | |
| 2009/0022400 A1 | * | 1/2009 | Matsuzaki | 382/190 |
| 2009/0040311 A1 | * | 2/2009 | Okamoto et al. | 348/181 |
| 2009/0154806 A1 | * | 6/2009 | Chang et al. | 382/173 |
| 2009/0328237 A1 | * | 12/2009 | Rodriguez et al. | 726/32 |
| 2010/0329547 A1 | * | 12/2010 | Cavet | 382/164 |

FOREIGN PATENT DOCUMENTS

JP 2007 164298 6/2007

* cited by examiner

*Primary Examiner* — Hung Lam
(74) *Attorney, Agent, or Firm* — Frommer Lawrence & Haug LLP; William S. Frommer

(57) ABSTRACT

There is provided an image processing apparatus including a representative image extraction unit for extracting a predetermined number of representative images from a series of images belonging to each scene, a representative image classification unit for, when two or more representative images are extracted from each scene, classifying the representative images into a main image and a sub-image, a degraded display image generation unit for generating a degraded display image by operating the sub-image in order to degrade and display the sub-image, and a representative image display unit for displaying the representative images of a plurality of scenes side by side in a scene transition sequence, and displaying the main image and the degraded display image when two or more representative images are extracted from each scene and the representative image when one representative image is extracted from each scene.

18 Claims, 22 Drawing Sheets

| IMAGE NUMBER | SCENE GROUP ID | ID WITHIN SCENE GROUP | SCENE PAIR ID |
|---|---|---|---|
| 1 | 1 | 1 | 1 |
| 2 | 2 | 1 | 1 |
| 3 | 3 | 1 | 1 |
| 4 | 4 | 1 | 1 |
| 5 | 3 | 2 | 2 |
| 6 | 4 | 2 | 2 |
| 7 | 3 | 3 | 3 |
| 8 | 5 | 1 | 3 |
| 9 | 6 | 1 | 3 |
| 10 | 5 | 2 | 4 |
| 11 | 6 | 2 | 4 |
| 12 | 5 | 3 | 5 |
| 13 | 6 | 3 | 5 |
| 14 | 1 | 2 | 6 |

FIG.9
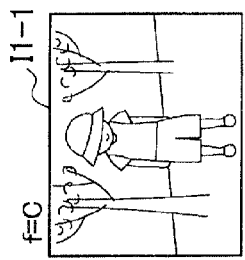
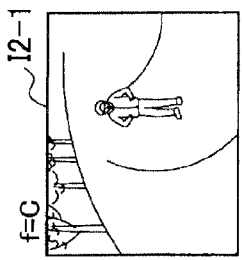
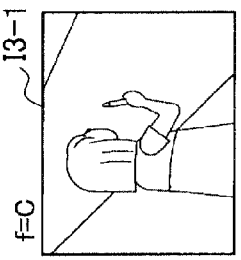
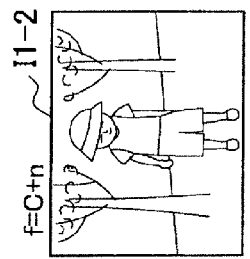
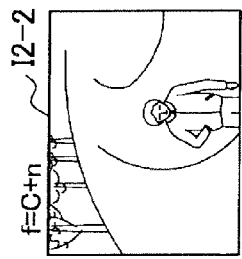
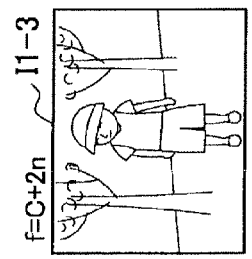
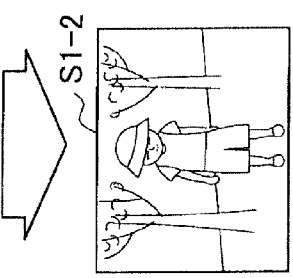
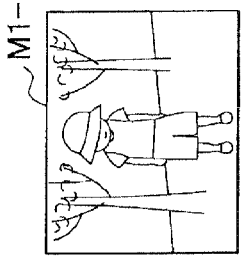
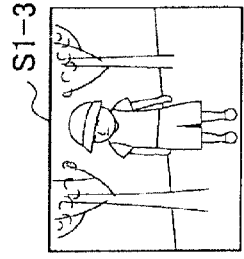
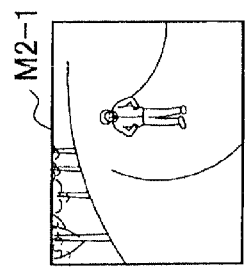
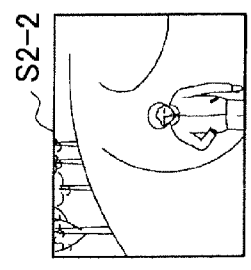
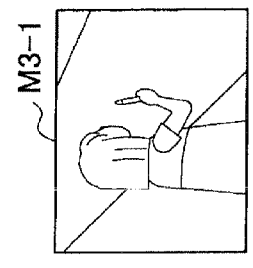

FIG.10
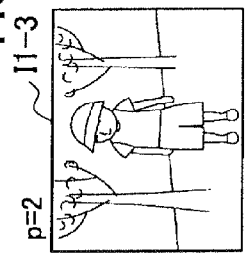
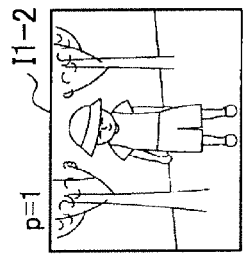
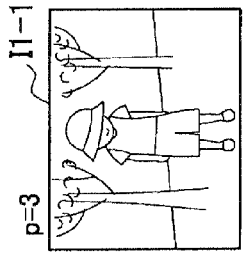
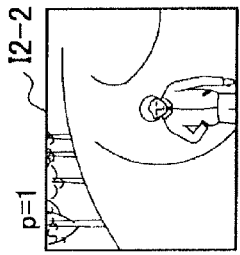
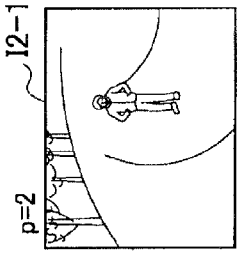
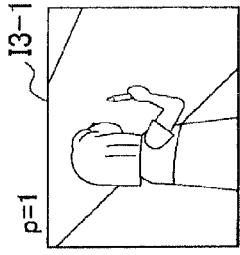
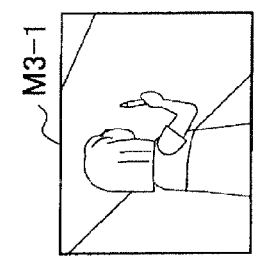
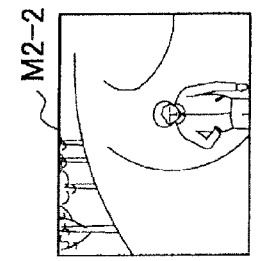
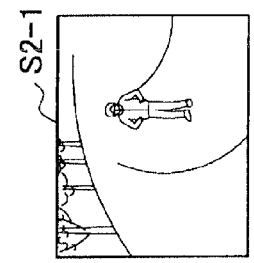
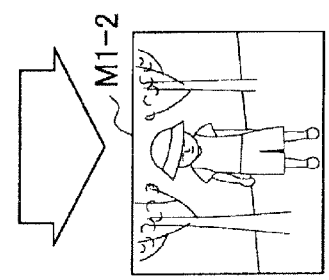
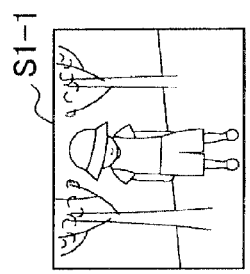

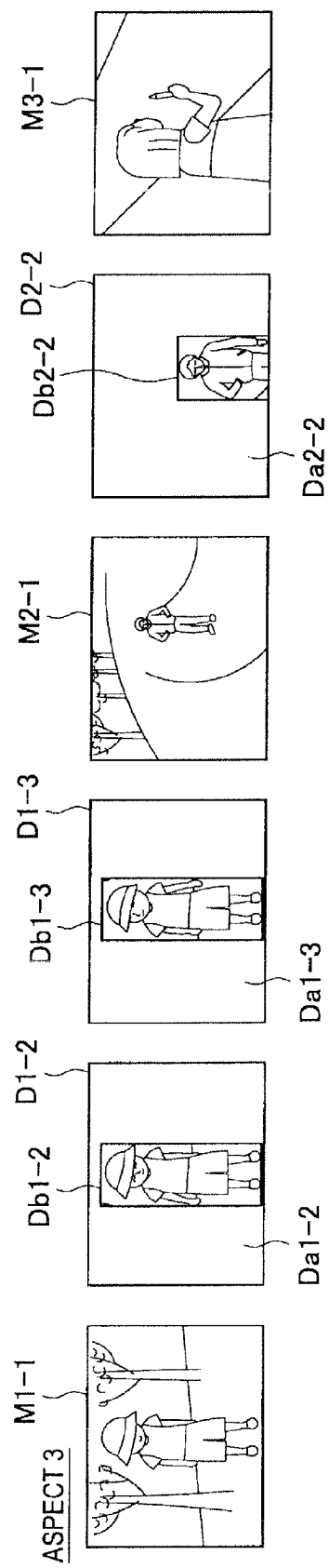

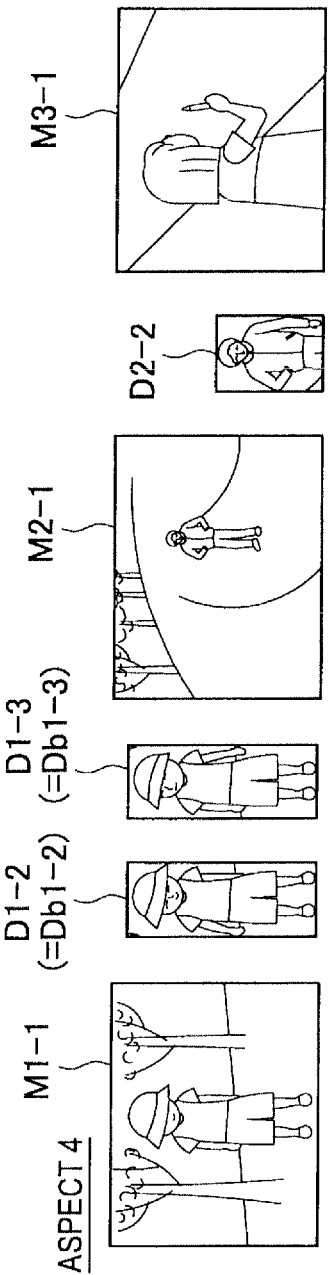

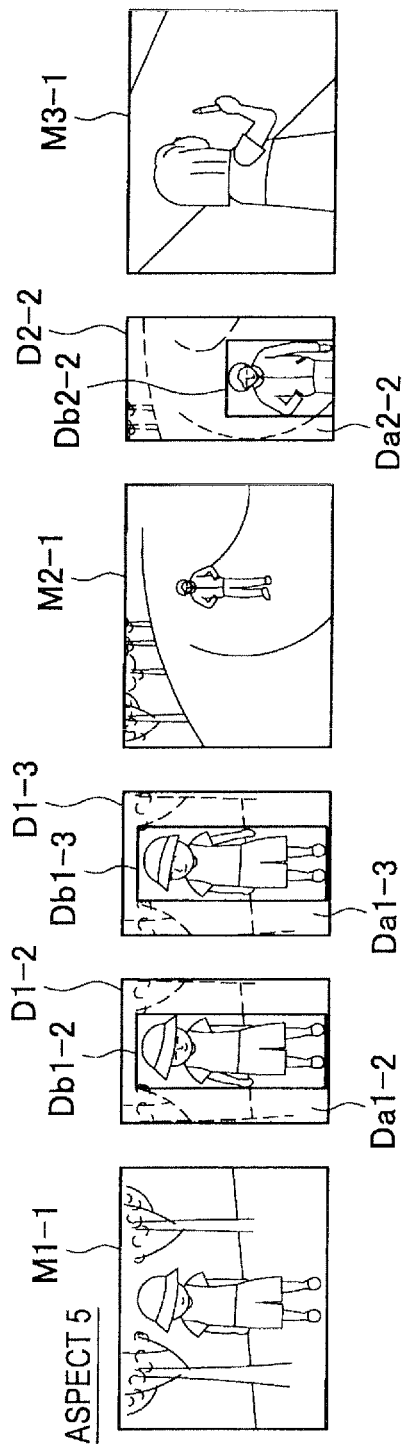

IMAGE PROCESSING APPARATUS, IMAGE PROCESSING METHOD AND PROGRAM

BACKGROUND OF THE INVENTION

1. Field of the Invention

The present invention relates to an image processing apparatus, an image processing method, and a program.

2. Description of the Related Art

In video expression, a typical video includes a plurality of scenes. In the video expression, a scene structure (also referred to as picture continuity) has been devised according to the intention of a producer such as separating scenes with the same content by a predetermined temporal interval.

SUMMARY OF THE INVENTION

However, in order to understand the scene structure of a video, a user other than a producer may perform scene cutting (also referred to as cutting) for classifying a video into a plurality of scenes. In such a case, a user not understanding the intention of a producer should classify scenes one by one, causing a large work load.

Furthermore, in order to overview a scene-cut video, representative images belonging to each scene may be displayed. In such a case, since the representative images belonging to each scene are typically similar to each other, the representative images are classified into main images and sub-images similar to the main images. Typically, while the main images are displayed, the sub-images are completely or incompletely displayed.

Here, when the sub-images are completely displayed, the display of the representative images is complicated. When the sub-images are incompletely displayed, loss of information such as a transition of a video may occur. Therefore, in any case, a user of a video may not easily understand the scene structure of the video by overviewing the scene-cut video.

In light of the foregoing, it is desirable to provide an image processing apparatus, an image processing method, and a program, which enable the scene structure of a video to be easily understood.

According to an embodiment of the present invention, there is provided an image processing apparatus including a scene transition detection unit for detecting a scene transition in a moving image based on data of the moving image including a series of images, a representative image extraction unit for extracting a predetermined number of representative images from a series of images belonging to each scene, a representative image classification unit for, when two or more representative images are extracted from each scene, classifying the representative images into a main image and a sub-image, a degraded display image generation unit for generating a degraded display image by operating the sub-image in order to degrade and display the sub-image, and a representative image display unit for displaying the representative images of a plurality of scenes side by side in a scene transition sequence, and displaying the main image and the degraded display image when two or more representative images are extracted from each scene and the representative image when one representative image is extracted from each scene.

The degraded display image generation unit may classify an image area of the sub-image into a change area and a non-change area, and generates the degraded display image by operating only an image of the non-change area included in the sub-image.

The degraded display image may be generated by reducing a number of colors of the image of the non-change area included in the sub-image.

The degraded display image may be generated by lowering a gray scale level of the image of the non-change area included in the sub-image.

The degraded display image may be generated by omitting the image of the non-change area included in the sub-image.

The degraded display image may be generated by cutting only an image of the change area included in the sub-image.

The degraded display image may be generated by reducing a number of colors or lowering a gray scale level of the image of the non-change area included in the sub-image, and cutting images of the change area and a part of the non-change area surrounding the change area.

The degraded display image may be generated by reducing a whole of the sub-image.

The degraded display image may be generated by reducing a number of colors of a whole of the sub-image.

The degraded display image may be generated by lowering a gray scale level of a whole of the sub-image.

The representative image extraction unit may extract a predetermined number of representative images corresponding to lengths of each scene.

The representative images of the plurality of scenes may be displayed side by side in the scene transition sequence, on a new line for each scene.

The image processing apparatus may further include a scene classification unit for classifying the plurality of scenes as scene groups based on feature amounts of the representative images of each scene.

The scene classification unit may classify the plurality of scenes as scene pairs with predetermined continuity based on a classification result of the scene groups.

Information indicating the scene groups may be stored as attribution information of the representative image of each scene in association with the data of the moving image.

Information indicating the scene pairs may be stored as attribution information of the representative image of each scene in association with the data of the moving image.

According to another embodiment of the present invention, there is provided an image processing method including the steps of detecting a scene transition in a moving image based on data of the moving image including a series of images, extracting a predetermined number of representative images from a series of images belonging to each scene, when two or more representative images are extracted from each scene, classifying the representative images into a main image and a sub-image, generating a degraded display image by operating the sub-image in order to degrade and display the sub-image, and displaying the representative images of a plurality of scenes side by side in a scene transition sequence, and displaying the main image and the degraded display image when two or more representative images are extracted from each scene and the representative image when one representative image is extracted from each scene.

According to another embodiment of the present invention, there is provided a program causing a computer to execute the steps of detecting a scene transition in a moving image based on data of the moving image including a series of images, extracting a predetermined number of representative images from a series of images belonging to each scene, when two or more representative images are extracted from each scene, classifying the representative images into a main image and a sub-image, generating a degraded display image by operating the sub-image in order to degrade and display the sub-image, and displaying the representative images of a plurality of scenes side by side in a scene transition sequence, and displaying the main image and the degraded display image when two or more representative images are extracted from each scene and the representative image when one representative image is extracted from each scene. In addition, the program may be provided using a computer readable recording medium or through a communication means and the like.

According to the embodiments of the present invention described above, it is possible to provide an image processing apparatus, an image processing method, and a program, which enable the scene structure of a video to be easily understood.

BRIEF DESCRIPTION OF THE DRAWINGS

FIG. 9 is a diagram illustrating an example of a result in which main images are selected from representative images.

FIG. 10 is a diagram illustrating another example of a result in which main images are selected from representative images.

FIG. 15C is a diagram illustrating an aspect 3 in which a sub-image is degraded and displayed by operating only an image of a non-change area.

FIG. 15D is a diagram illustrating an aspect 4 in which a sub-image is degraded and displayed by operating only an image of a non-change area.

FIG. 15E is a diagram illustrating an aspect 5 in which a sub-image is degraded and displayed by operating only an image of a non-change area.

DETAILED DESCRIPTION OF THE EMBODIMENT(S)

Figure 1:
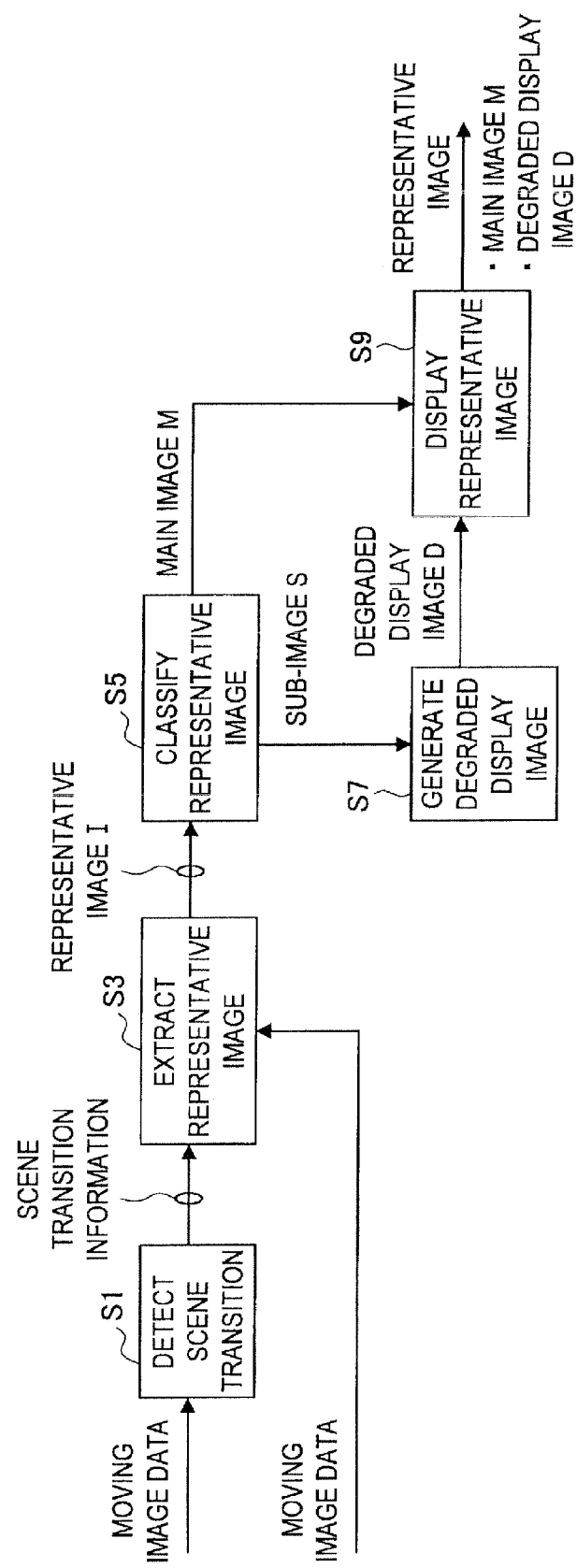
FIG. 1 is a diagram illustrating the overview of an image processing method according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

[1. Overview of Image Processing Method]

First, the overview of the image processing method according to an embodiment of the present invention will be described with reference to FIG. 1.

As illustrated in FIG. 1, in the image processing method according to the embodiment, a scene transition in a moving image is first detected based on data of the moving image (moving image data) including a series of images (step S1). Next, a predetermined number of representative images I (I is a general term for representative images) are extracted from the series of images belonging to each scene based on a detection result (scene transition information) of the scene transition (S3). The representative images I are images extracted from the series of images belonging to each scene according to predetermined standards.

When two or more representative images I are extracted from each scene, the representative images I are classified into main images M (M is a general term for main images) and sub-images S (S is a general term for sub-images) (S5), and in order to degrade and display the sub-images S, degraded display images D (D is a general term for degraded display images) are generated by operating the sub-images S (S7). Then, representative images I of a plurality of scenes are displayed side by side in the scene transition sequence. Here, in each scene, when two or more representative images I are extracted, both the main images M and the degraded display images D are displayed, and when one representative image I is extracted, the representative image I is displayed as the main image M (S9).

The main image M is images selected from the representative images I according to predetermined standards, and the sub-images S are all images other than the main images M among the representative images I and are similar to the main images M. The degraded display images D, which will be described in detail later, are generated by operating at least a part of the sub-images S such that the main images M are displayed with greater emphasis than the sub-images S.

As described above, since the main images M and the degraded display images D are displayed, the display of the representative images I is not complicated and no loss of information such as a transition of a video occurs. Thus, a user of a video can overview a scene-cut video and easily understand the scene structure of a video.

Furthermore, in an image processing method according to another embodiment, an image area of the sub-image S is classified into a change area and a non-change area, and the degraded display image D is generated by operating only an image Sa (Sa is a general term for images of the non-change area included in the sub-image S) of the non-change area included in the sub-image S. In the image area of the sub-image S, the change area indicates an image area where image information changes above a predetermined threshold value between sub-images S in succession, and the non-change area indicates an image area where image information does not change above the predetermined threshold value between the sub-images S in succession.

Then, representative images I of a plurality of scenes are displayed side by side in the scene transition sequence. Here, when two or more representative images I are extracted from each scene, both a main image M and a degraded display image D, which is obtained by operating only an image Sa of a non-change area included in a sub-image S, are displayed.

As described above, since both the main image M and the degraded display image D, which is obtained by operating only the image Sa of the non-change area included in the sub-image S, are displayed, information such as a transition of a video is displayed with emphasis. Thus, a user of the video can only overview the scene-cut image while referring to the transition of the video, and can also easily understand the scene structure of the video.

[2. Configuration of Image Processing Apparatus]

Next, the image processing apparatus according to the embodiment of the present invention will be described with reference to FIGS. 2 to 6.

Figure 2:
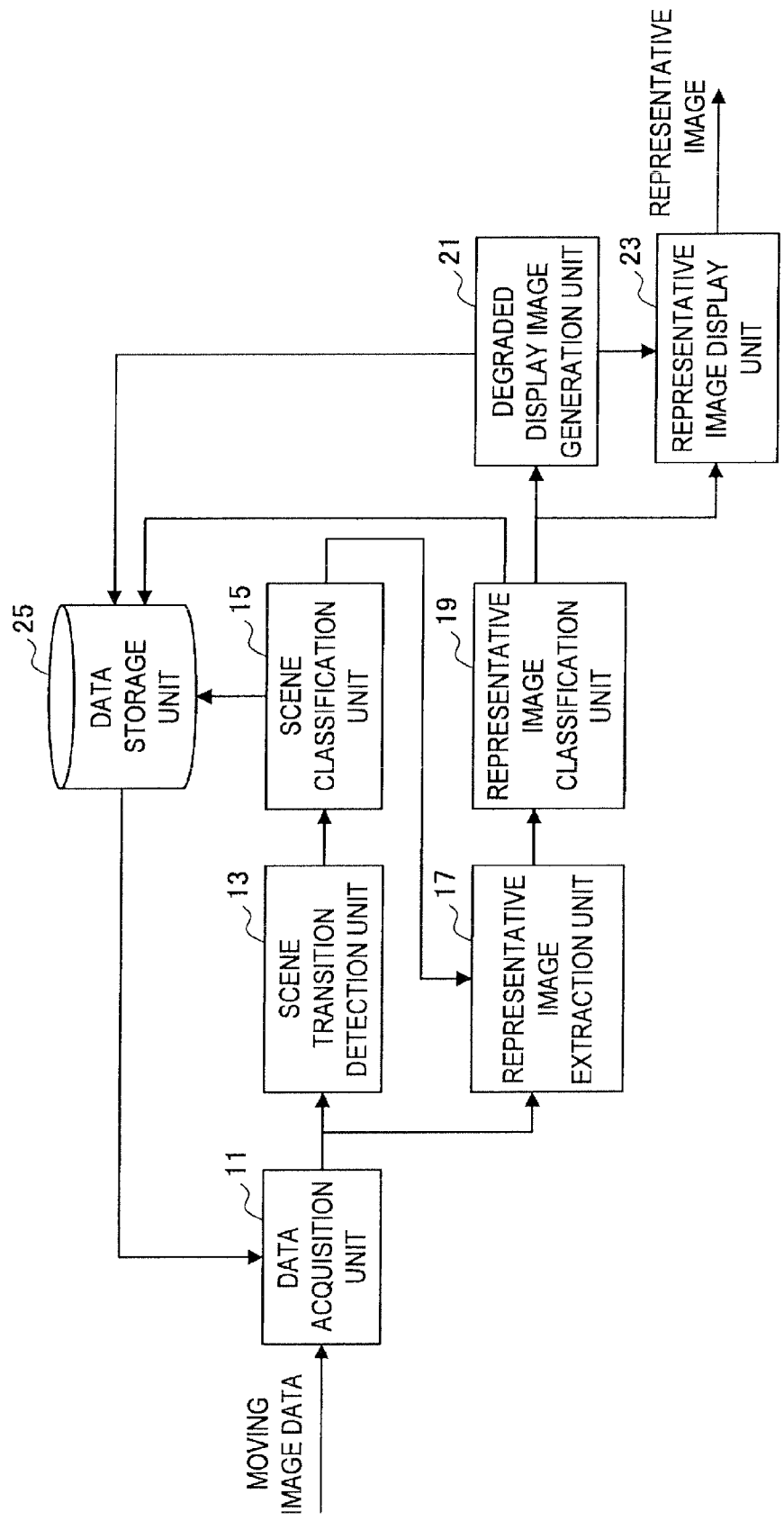
FIG. 2 is a block diagram illustrating a configuration of an image processing apparatus according to a first embodiment of the present invention.

As illustrated in FIG. 2, the image processing apparatus includes a data acquisition unit 11, a scene transition detection unit 13, a scene classification unit 15, a representative image extraction unit 17, a representative image classification unit 19, a degraded display image generation unit 21, a representative image display unit 23, and a data storage unit 25.

The data acquisition unit 11 acquires data (moving image data) of a moving image including a series of images, and supplies the moving image data to the scene transition detection unit 13 and the representative image extraction unit 17. In addition, the moving image data may be acquired from the data storage unit 25, or an external apparatus (not shown) through a communication means and the like (not shown).

The scene transition detection unit 13 detects a scene transition in the moving image based on the moving image data, and supplies a detection result to the scene classification unit 15. The scene transition means a change of a scene in a video. Feature amounts S of images in succession is obtained and the scene transition is detected based on the degree of similarity of the feature amounts S of the images. As the feature amounts S of the images, a color histogram, a detection result of a facial image and the like may be used. Here, when the degree of similarity of the feature amounts S between the images in succession is smaller than a predetermined threshold value, the scene transition is detected.

The scene classification unit 15, which will be described in detail later, classifies a plurality of scenes as scene groups and scene pairs based on feature amounts S of the representative images I belonging to each scene, and supplies a classification result to the representative image extraction unit 17. The scene group is a scene group including scenes similar to one another and the scene pair includes at least two scenes forming a pair having predetermined continuity. Furthermore, the scene classification unit 15 adds attribute information indicating the scene groups and the scene pairs to the representative images I. The attribute information may be supplied to the data storage unit 25, an external apparatus and the like as will be described later.

The representative image extraction unit 17 extracts a predetermined number of representative images I from a series of images belonging to each scene, and supplies the representative images I to the representative image classification unit 19. The representative images I are extracted from the series of images belonging to each scene according to predetermined standards. The representative image I may be extracted as one image for each scene, two or more images for each scene, or a predetermined number of images corresponding to scene lengths. In addition, when extracting the predetermined number of images corresponding to the scene lengths, a predetermined number of images proportional to the scene lengths may be extracted or a predetermined number of images set in a step-by-step manner corresponding to the scene lengths may be extracted. Consequently, the length of a scene may be indicated by the number of the representative images I.

When two or more representative images I are extracted from each scene, the representative image classification unit 19 classifies the representative images I into main images M and sub-images S, and supplies the main images M and the sub-images S to the representative image display unit 23 and the degraded display image generation unit 21, respectively. The main images M are images selected from the representative images I according to predetermined standards, and the sub-images S are all images other than the main images M among the representative images I and are similar to the main images M. In addition, when only one representative image I is extracted from each scene, the representative image I includes only a main image M.

The degraded display image generation unit 21, which will be described in detail later, generates a degraded display image D by operating a sub-image S and supplies the sub-image S to the representative image display unit 23 in order to degrade and display the sub-image S. Here, the degraded display image D may be generated by operating the whole of the sub-image S or only the image Sa of the non-change area included in the sub-image S. The degraded display image D is an image generated by operating at least a part of the sub-image S such that a main image M is displayed with greater emphasis than the sub-image S. The image area of the sub-image S is classified into the change area where image information changes above a predetermined threshold value between sub-images S in succession, and the non-change area where image information does not change above the predetermined threshold value between the sub-images S in succession.

The representative image display unit 23 displays representative images I of a plurality of scenes side by side in the scene transition sequence. Furthermore, when two or more representative images I are extracted from each scene, the representative image display unit 23 displays both main images M and degraded display images D. When one representative image I is extracted, the representative image display unit 23 displays the representative image I as a main image M.

The data storage unit 25 stores the moving image data and data attached to the moving image data. In the data storage unit 25, a process result by the scene classification unit 15 may be stored as attribute information of the representative image I in association with the moving image data. Furthermore, in the data storage unit 25, data of main images M and degraded display images D may be stored in association with the moving image data. The attribute information may be used inside an image processing apparatus or in an external apparatus, which has received the attribute information from the image processing apparatus, as moving image search data as will be described later.

In the functional configuration, the data acquisition unit 11, the scene transition detection unit 13, the scene classification unit 15, the representative image extraction unit 17, the representative image classification unit 19, and the degraded display image generation unit 21 are configured by an operation processing device such as a CPU or a digital signal processor (DSP), the representative image display unit 23 is configured by a display device such as a liquid crystal device; and the data storage unit 25 is configured by a non-volatile memory such as a flash memory, an external storage device such as a hard disk drive or a blue-ray disc drive, and the like. The CPU performs an image processing method by developing and executing a program read from a ROM and the like on a RAM. In addition, the functional configuration may be configured as hardware in which at least a part thereof is a dedicated logic and the like.

[3. First Embodiment (Scene Cutting Process of Video)]

Next, the scene cutting process of the video will be described with reference to FIGS. 3 to 6.

Figure 3:
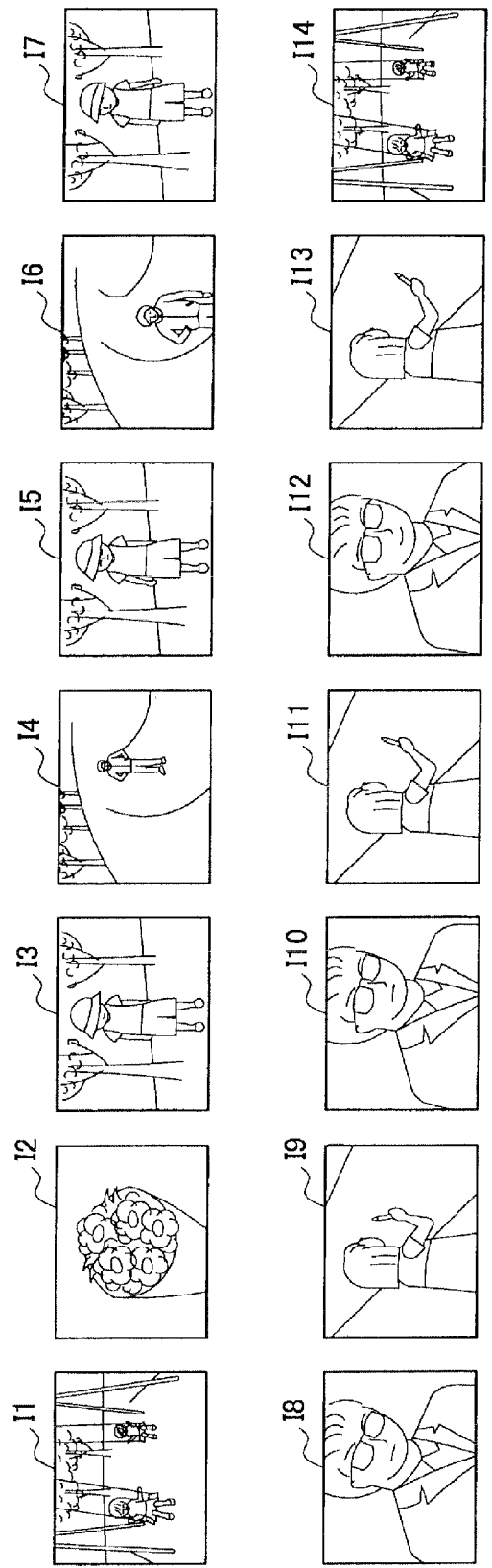
FIG. 3 is a diagram illustrating an example of representative images to be subject to a scene cutting process.

FIG. 3 illustrates representative images I1 to I14 to be subject to a scene cutting process. Scene transitions of scenes 1 to 14 are detected from data of a moving image including a series of images, and the representative images I1 to I14 are extracted from a series of images belonging to each scene. In such a case, the representative images I1 to I14 are extracted from the series of images belonging to each scene as one representative image I according to predetermined standards.

Here, as illustrated in FIG. 3, the representative images I1 and I14 are similar to each other, the representative images I3, I5 and I7 are similar to one another, the representative images I4 and I6 are similar to each other, the representative images I8, I10 and I12 are similar to one another, and the representative images I9, I11 and I13 are similar to one another, but the representative image I2 is not similar to the other representative images I1, and I3 to I14.

Figure 4:
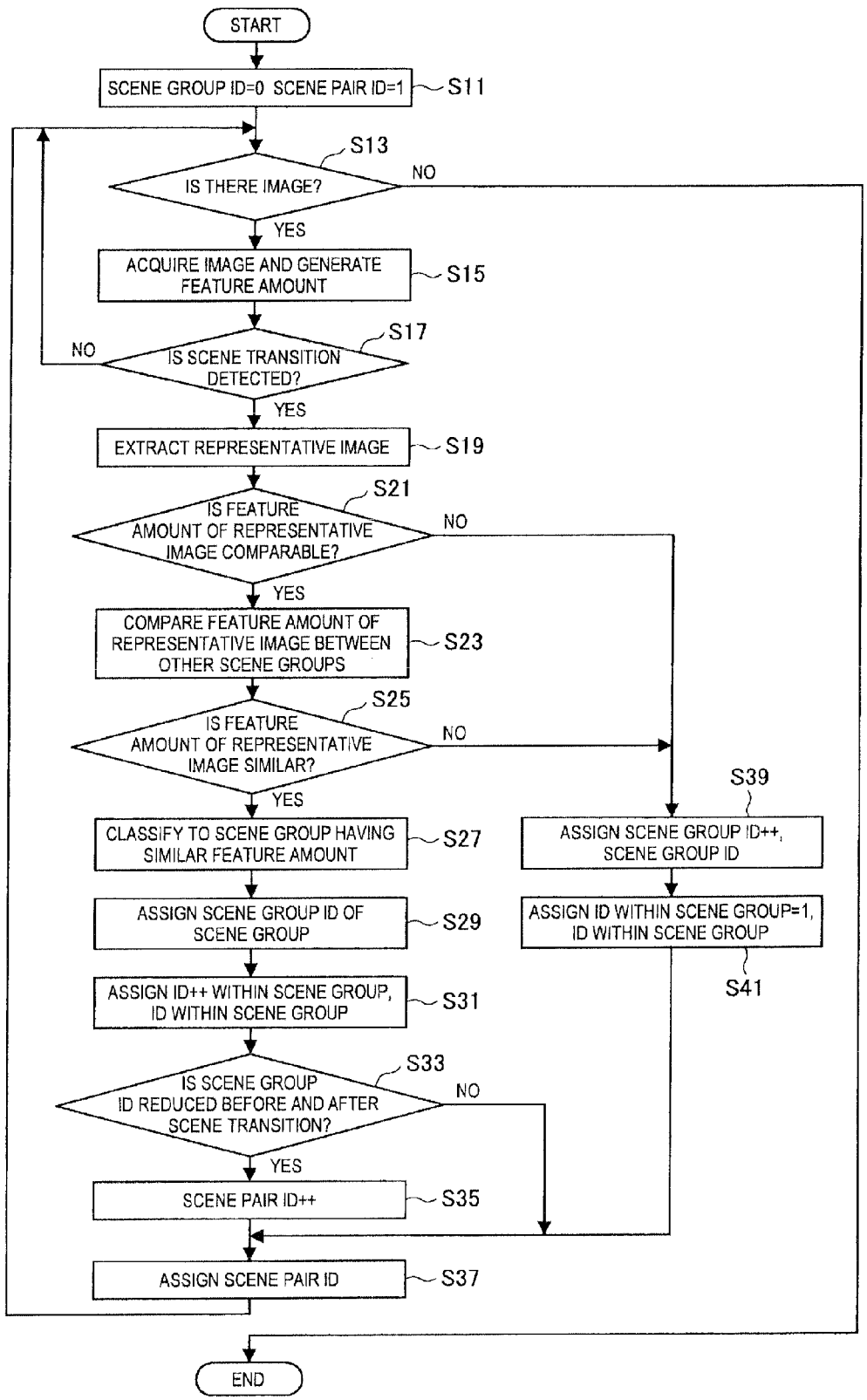
FIG. 4 is a flow chart illustrating the procedure of a scene cutting process.

The scene cutting process is performed by the scene classification unit 15 according to the procedure illustrated in FIG. 4. First, a scene group ID and a scene pair ID are initialized (step S11). Next, an image to be processed is acquired from data of a moving image including a series of images, a feature amount S of the image is generated (S15), and a scene transition is detected based on the degree of similarity of the feature amount S (S17). In addition, if all images are acquired from the moving image data (S13), the scene cutting process is terminated.

If a first scene transition is detected (S17), the representative image I1 of a scene 1 with the feature amount S is extracted (S19). Here, as the feature amount S of the representative image I1, a color histogram, a detection result of a facial image and the like may be used. Since other feature amounts S to be compared with the feature amount S of the representative image I1 are not acquired (No in S21), a scene group 1 of a feature amount S1 (=the feature amount S of the representative image I1) is generated, and a scene group ID '1', an ID '1' within a scene group and a default scene pair ID '1' are assigned to the representative image I1 (S39, S41 and S37).

If a second scene transition is detected (S17), the representative image I2 of a scene 2 with the feature amount S is extracted (S19). Then, the feature amount S of the representative image I2 is compared with the feature amount S1 of the representative image I1 (S23) and it is determined that the feature amount S is not similar to the feature amount S1 (No in S25). Thus, a scene group 2 of a feature amount S2 (=S) is generated, and the scene group ID '2' and the ID '1' within a scene group are assigned to the representative image I2 (S39 and S41). Furthermore, since a scene group is generated anew, the previous scene pair ID '1' is assigned (S37).

In the same manner as above, if a third scene transition is detected (S17), a scene group 3 of a feature amount S3 (=the feature amount S of the representative image I3) is generated based on the feature amount S of the representative image I3, and the scene group ID '3', the ID '1' within a scene group and a default scene pair ID '1' are assigned to the representative image I3 of a scene 3 (S39, S41 and S37). In the same manner as above, if a fourth scene transition is detected (S17), a scene group 4 of a feature amount S4 (=the feature amount S of the representative image I4) is generated based on the feature amount S of the representative image I4, and the scene group ID '4', the ID '1' within a scene group and the default scene pair ID '1' are assigned to the representative image I4 of a scene 4 (S39, S41 and S37).

If a fifth scene transition is detected (S17), the representative image I5 of a scene 5 with the feature amount S is extracted. Then, the feature amount S of the representative image I5 is compared with the feature amounts S1 to S4 of the representative images I1 to I4 and it is determined that the feature amount S is similar to the feature amount S3 (Yes in S25). Thus, the scene group ID '3' is assigned to the representative image I5 (S29), the ID within a scene group of the scene group ID '3' is increased by 1, and the ID '2' within a scene group is assigned to the representative image I5 (S31). Furthermore, since the scene group ID is reduced from 4 to 3 before and after the scene transition (Yes in S33), the start of another scene pair is detected, the scene pair ID '1' is increased by 1 (S35), and the scene pair ID '2' is assigned to the representative image I5 (S37).

In the same manner as above, if a sixth scene transition is detected (S17), the representative image I6 of a scene 6 is classified as the scene group 4 with the feature amount S4 based on the feature amount S of the representative image I6, the scene group ID '4' is assigned to the representative image I6 (S29), the ID within a scene group of the scene group ID '4' is increased by 1, and the ID '2' within the scene group is assigned to the representative image I6 (S31). Furthermore, since the scene group ID is increased from 3 to 4 before and after the scene transition (No in S33), the previous scene pair ID '2' is assigned to the representative image I6 (S37).

Figure 5:
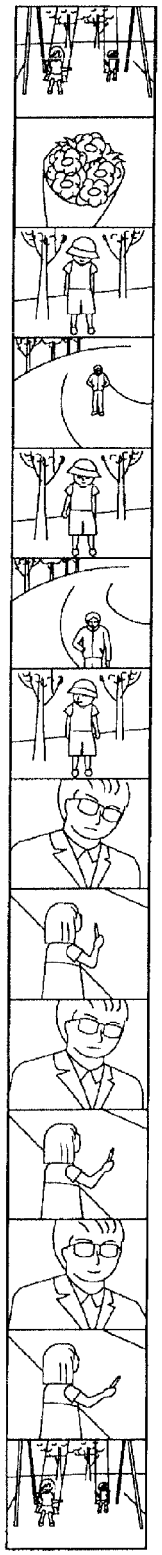
FIG. 5 is a diagram illustrating an example of a result of a scene cutting process.

Then, the same process is performed with respect to seventh to fourteenth scene transitions (S17), and the moving image including the representative images I1 to I14 is subjected to scene cutting as illustrated in FIG. 5. That is to say, the representative images I1 and I14 are classified as the scene group 1, the representative image I2 is classified as the scene group 2, the representative images I3, I5 and I7 are classified as the scene group 3, the representative images I4 and I6 are classified as the scene group 4, the representative images I8, I10 and I12 are classified as a scene group 5, and the representative images I9, I11 and I13 are classified as a scene group 6.

Furthermore, the IDs '1 and 2' within the scene group are assigned to the representative images I1 and I14, the ID '1' within the scene group is assigned to the representative image I2, the IDs '1 to 3' within the scene group are assigned to the representative images I3, I5 and I7, the IDs '1 and 2' within the scene group are assigned to the representative images I4 and I6, the IDs '1 to 3' within the scene group are assigned to the representative images I8, I10 and I12, and the IDs '1 to 3' within the scene group are assigned to the representative images I9, I11 and I13, respectively.

Furthermore, the pair ID '1' is assigned to the representative images I1 to 14 forming a first pair, the pair ID '2' is assigned to the representative images I5 and I6 forming a second pair, the pair ID '3' is assigned to the representative images I7 to I9 forming a third pair, the pair ID '4' is assigned to the representative images I10 and I11 forming a fourth pair, the pair ID '5' is assigned to the representative images I12 and I13 forming a fifth pair, and the pair ID '6' is assigned to the representative image I14 forming a sixth pair.

Here, when comparing the feature amounts S, a comparison based on the feature amount S of a predetermined scene estimated from the scene group ID and the scene pair ID of the representative image I belonging to the immediately previous scene may be preferentially performed. For example, when the seventh scene transition is detected, the scene group ID '3' may be estimated rather than the scene group ID '4' and the scene pair ID '2' of the representative image I6 belonging to the immediately previous scene 6, and a comparison based on the feature amount S3 corresponding to the scene group ID '3' may be preferentially performed before a comparison based on the feature amount S4 corresponding to the scene group ID '4' is performed.

The scene group ID, the ID within the scene group, and the scene pair ID are assigned to the representative images I1 to I14 as attribute information. The attribute information is stored in the data storage unit 25 and the like as attribute information of the representative images I1 to I14, which belong to the scenes 1 to 14 respectively, in association with moving image data including the representative images I1 to I14. Also, a moving image database including the attribute information is constructed inside or outside the image processing apparatus, thereby enabling a moving image search using the attribute information as search conditions. Consequently, it is possible to perform a nonconventional moving image search based on the scene structure of a video.

Figure 6:
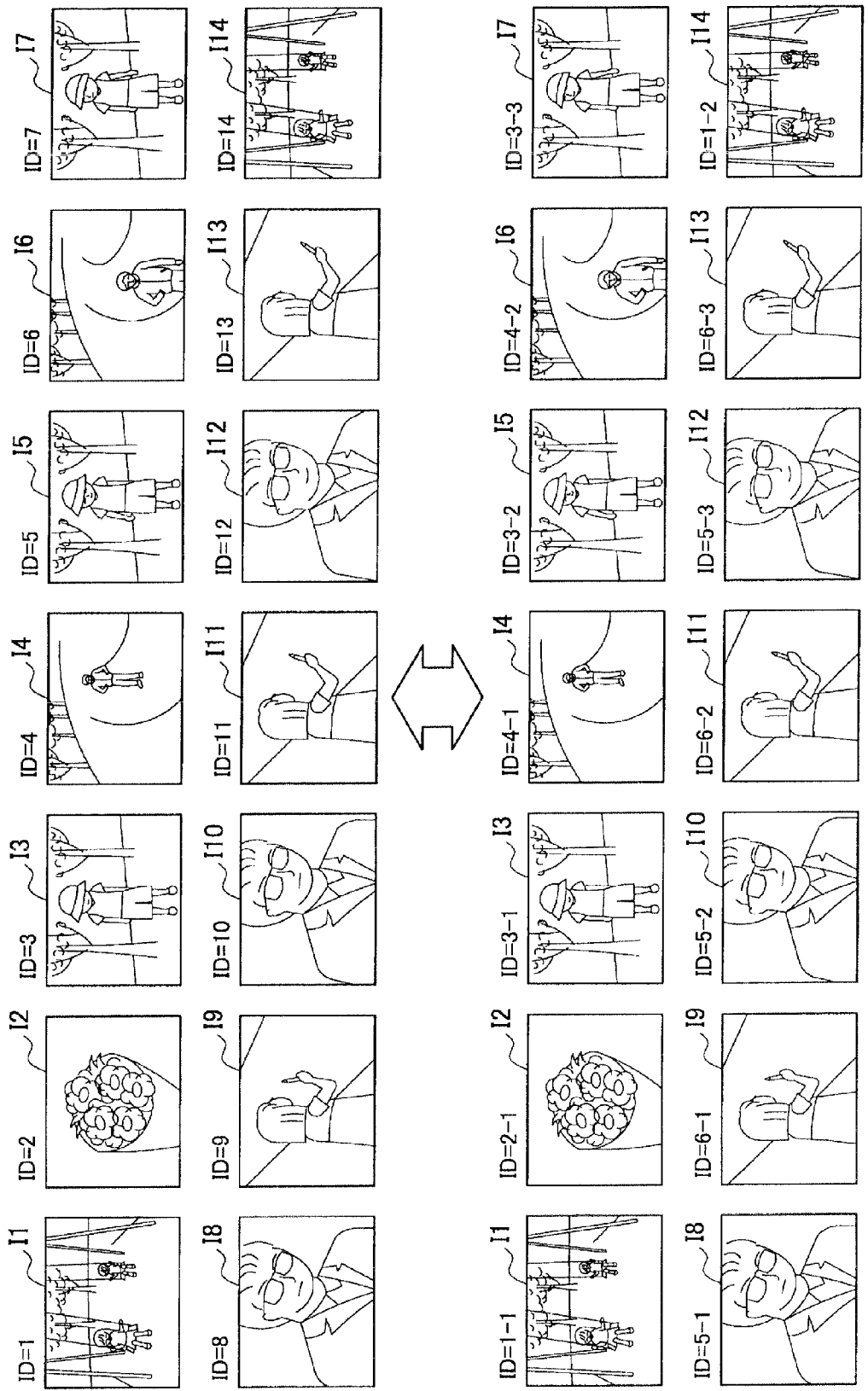
FIG. 6 is a diagram illustrating an example of a result of a scene cutting process together with representative images.

FIG. 6 illustrates a result of the scene cutting process together with the representative images I1 to I14. The result of the scene cutting process is displayed on the representative image display unit 23. FIG. 6 comparatively illustrates the case where the result of the scene cutting process is indicated using sequence number IDs '1 to 14' (the upper portion of FIG. 6) along with the case where the result of the scene cutting process is indicated using IDs including the scene group ID and the ID within the scene group (the lower portion of FIG. 6).

When the result of the scene cutting process is indicated using the sequence numbers ID according to the conventional art, the sequence number IDs '1 to 14' are sequentially assigned to the representative images I1 to I14. Meanwhile, when the result of the scene cutting process is indicated using the IDs including the scene group ID and the ID within the scene group as described above, the similar representative images I are classified into scene groups and IDs indicating a classification result are assigned to the representative images I.

That is to say, IDs '1-1 and 1-2' are assigned to the representative images I1 and I14, an ID '2-1' is assigned to the representative image I2, IDs '3-1 to 3-3' are assigned to the representative images I3, I5 and I7, IDs '4-1 and 4-2' are assigned to the representative images I4 and I6, IDs '5-1 to 5-3' are assigned to the representative images I8, I10 and I12, and IDs '6-1 to 6-3' are assigned to the representative images I9, I11 and I13, respectively. Here, in the ID, a number before the hyphen indicates the scene group ID and a number after the hyphen indicates the ID within the scene group.

Consequently, it is possible to easily understand a scene structure for indicating scene repetition using scenes 3, 5 and 7 with the scene group ID '3' and scenes 4 and 6 with the scene group ID '4'. Furthermore, it is possible to easily understand a scene structure for indicating scene repetition using scenes 8, 10 and 12 with the scene group ID '5' and scenes 9, 11 and 13 with the scene group ID '6'. In addition, it is possible to understand a scene (the scene 2) expressed only once and scenes (the scenes 1 and 14) separated by a predetermined temporal interval.

As described above, in accordance with the image processing apparatus and the image processing method according to the first embodiment of the present invention, a plurality of scenes are classified as the scene group and the scene pair based on the feature amount S of the representative image I belonging to each scene, so that it is possible to easily understand the scene structure of a video. Furthermore, a classification result is stored as the attribute information of the representative image I together with the moving image data, so that it is possible to perform a moving image search based on the scene structure of the video.

[4. Second Embodiment (Degraded Display of Sub-Image by Operating Whole of Sub-Image)]

Next, an image processing apparatus according to a second embodiment of the present invention will be described with reference to FIGS. 7 to 10, 11A to 11C, and 12A and 12B.

Figure 7:
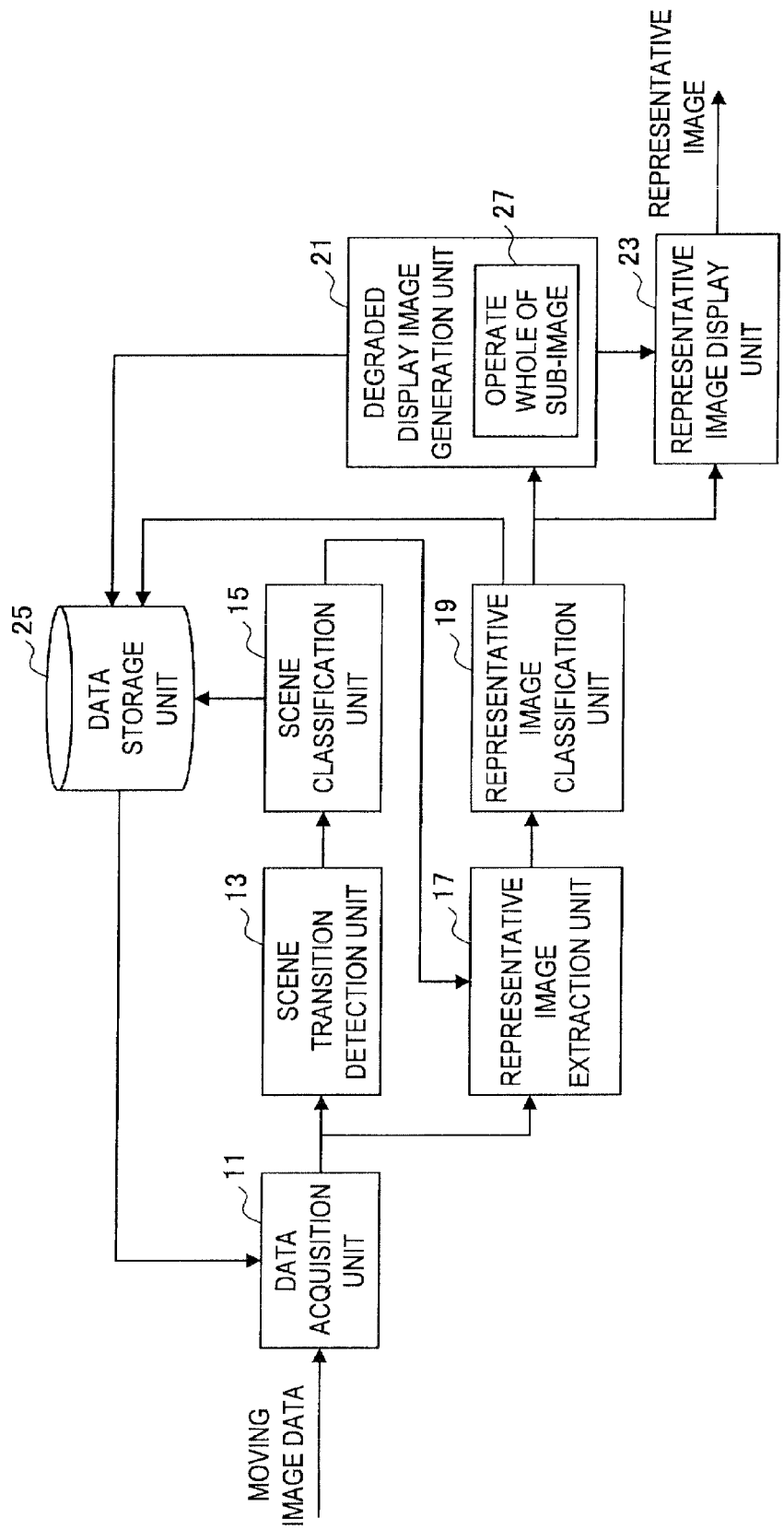
FIG. 7 is a block diagram illustrating a configuration of an image processing apparatus according to a second embodiment of the present invention.

As illustrated in FIG. 7, in the image processing apparatus according to the second embodiment, the degraded display image generation unit 21 generates a degraded display image D by operating the whole of a sub-image S of a representative image I (27). The degraded display image generation unit 21 performs an operation such as reduction, color reduction or lowering of a gray scale level with respect to the whole of the sub-image S.

When two or more representative images I are extracted from each scene, the image processing apparatus according to the second embodiment performs a process of displaying the representative images I of each scene such that a user can overview the scene-cut video. In the second embodiment, a main image M of the representative image I is displayed and a sub-image S of the representative image I is degraded and displayed by operating the whole of the sub-image S as described later.

First, a predetermined number of representative images I, for example, which correspond to scene lengths and the like, are extracted from a series of images belonging to each scene. Next, when two or more representative images I are extracted from each scene, the representative images I are classified into main images M and one or more sub-images S similar to the main images M.

Figure 8:
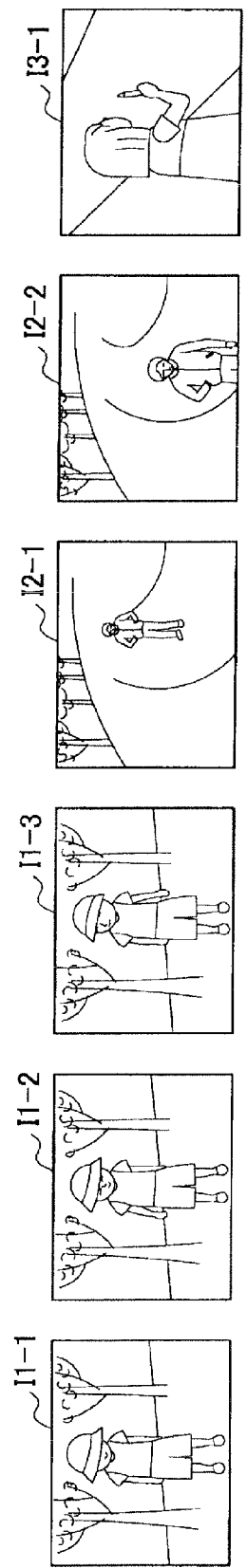
FIG. 8 is a diagram illustrating an example of representative images to be displayed.

FIG. 8 illustrates an example of representative images I to be displayed. In the example illustrated in FIG. 8, three representative images I1-1, I1-2 and I1-3 of a scene 1, two representative images I2-1 and I2-2 of a scene 2, and one representative image I3-1 of a scene 3 are displayed. Here, in the scenes 1 and 2, since two or more representative images I are extracted, the representative images I are classified into main images M and sub-images S. In the scene 3, since one representative image I is extracted, the representative image I is classified as a main image M.

FIG. 9 illustrates an example of a result in which main images M are selected from representative images I. In the example illustrated in FIG. 9, the representative images I, for example, are extracted from a series of images belonging to each scene at a predetermined interval (every n frames and the like). In such a case, the representative images I are extracted as images with the frame numbers f assigned to each scene among the series of images belonging to each scene, wherein f=C (C is an arbitrary frame number), f=C+n, f=C+2n .... Of course, if the length of the scene is short, a case may occur where only an image with the frame number (f=C) may be extracted or f=C=1.

Then, the main images M are selected from two or more representative images I according to predetermined standards. Here, the main images M, for example, may be sequentially selected from an image with the minimum frame number f, an image with the maximum frame number f, or an image with an intermediate value among a series of representative images I. Furthermore, the main images M may be selected as images with a display sequence such as $1^{st}$, $(1+m)^{th}$ or $(1+2m)^{th}$ among the series of representative images I. In the example illustrated in FIG. 9, representative images I1-1, I2-1 and I3-1 are selected as main images M1-1, M2-1 and M3-1, and representative images I1-2, I1-3 and I2-2 are selected as sub-images S1-2, S1-3 and S2-2, respectively.

Further, FIG. 10 illustrates another example of a result in which main images M are selected from representative images I. In the example illustrated in FIG. 10, the representative images I, for example, are extracted from a series of images belonging to each scene according to priorities P preset to each image. In such a case, the representative images I are extracted as images with the priorities P of 1, 2, 3 . . . among the series of images belonging to each scene. Of course, if the length of the scene is short, a case may occur where only an image with the priority P of 1 is extracted.

Then, the main images M are selected from two or more representative images I according to predetermined standards. Here, the main images M may be selected based on a frame number f, or a display sequence of the representative images I. In the example illustrated in FIG. 10, representative images I1-2, I2-2 and I3-1 are selected as main images M1-1, M2-2 and M3-1, and representative images I1-1, I1-3 and I2-1 are selected as sub-images S1-1, S1-3 and S2-1.

When two or more representative images I are extracted from each scene, degraded display images D are generated by operating the whole of sub-images S in order to degrade and display the sub-images S. Then, representative images I of a plurality of scenes are displayed side by side in the scene transition sequence. In each scene, when two or more representative images I are extracted, both the main images M and the degraded display images D are displayed, and when one representative image I is extracted, the representative image I is displayed as the main image M.

Figure 11A:
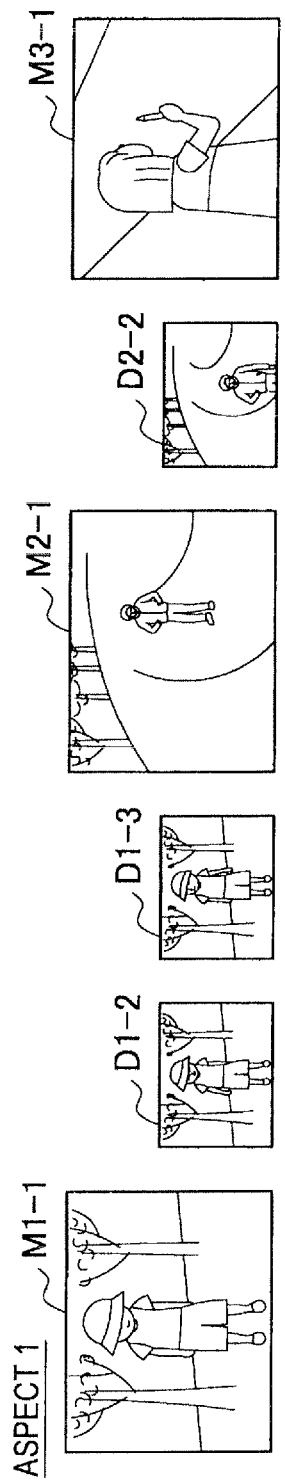
FIG. 11A is a diagram illustrating an aspect 1 in which a sub-image is degraded and displayed by operating the whole of the sub-image.
Figure 11B:
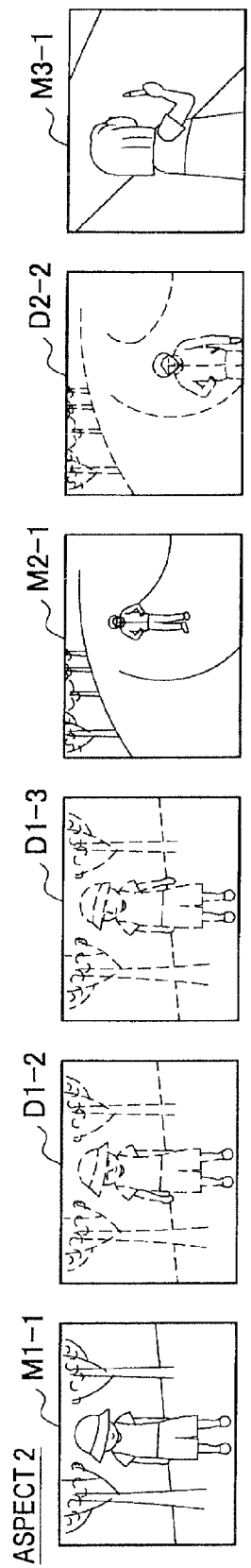
FIG. 11B is a diagram illustrating an aspect 2 in which a sub-image is degraded and displayed try operating the whole of the sub-image.
Figure 11C:
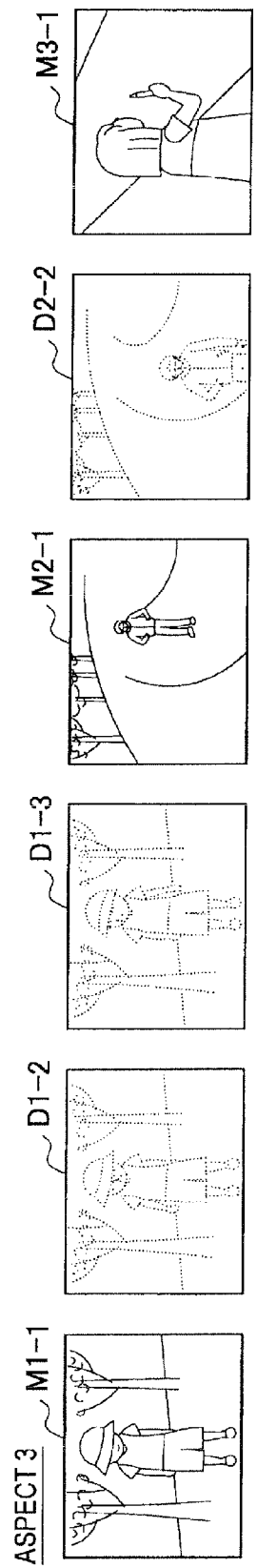
FIG. 11C is a diagram illustrating an aspect 3 in which a sub-image is degraded and displayed by operating the whole of the sub-image.

FIGS. 11A to 11C illustrate examples of degraded display of a sub-image S by the operation of the whole of the sub-image S. In the examples illustrated in FIGS. 11A to 11C, among the representative images I1-1, I1-2, I1-3, I2-1, I2-2 and I3-1 of the scenes 1 to 3 illustrated in FIG. 8, the representative images I1-1, I2-1 and I3-1 are displayed as main images M1-1, M2-1 and M3-1, and the representative images I1-2, I1-3 and I2-2 are displayed as degraded display images D1-2, D1-3 and D2-2.

In an aspect 1 illustrated in FIG. 11A, the degraded display images D are generated by reducing the whole of the sub-image S, so that the sub-image S is degraded and displayed. In such a case, in a range in which image information can be determined, the sub-image S may be reduced to any size smaller than that of the main images M.

In an aspect 2 illustrated in FIG. 11B, the degraded display images D are generated by subjecting the whole of the sub-image S to color reduction (the sub-image is expressed with a small number of colors as compared with the original image), so that the sub-image S is degraded and displayed. In such a case, the degraded display images D may be expressed with black and white, or a sepia color and the like. In addition, in FIG. 11B, for the convenience of display, images with a reduced number of colors are indicated by dotted line images.

In an aspect 3 illustrated in FIG. 11C, the degraded display images D are generated by lowering the gray scale level of the whole of the sub-image S, so that the sub-image S is degraded and displayed. In such a case, the degraded display images D may be expressed with a gray scale lower than that of the main images M by darkly expressing image information, lightly expressing the image information, or expressing the image information with lowered contrast. In addition, in FIG. 11C, for the convenience of display, images with reduced gray scale are indicated by dotted line images.

Furthermore, the degraded display images D, for example, may be generated by appropriately combining the aspects 1 to 3 with one another such as combination of the reduction and color reduction for the whole of the sub-image S. The degraded display images D may be generated by performing the lowering of a resolution, line drawing, gradation and the like for the whole of the sub-image S. In addition, among a plurality of sub-images S, a size to be reduced may be changed, the number of colors to be reduced may be changed, or a gray scale level to be lowered may be changed step by step, for example, according to a frame sequence, priorities and the like.

Figure 12A:
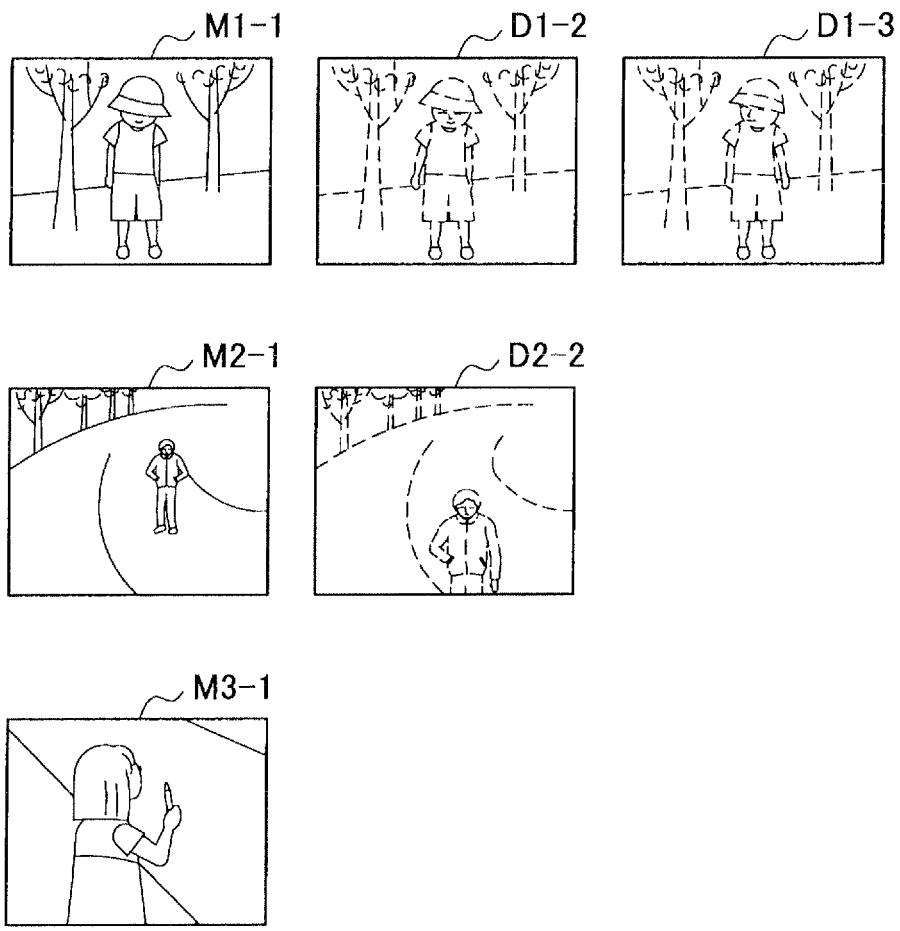
FIG. 12A is a diagram illustrating another example in which a sub-image is degraded and displayed by operating the whole of the sub-image.

FIG. 12A illustrates another example in which a sub-image S is degraded and displayed. In the example illustrated in FIG. 12A, representative images of each scene are subjected to line feed for each scene and displayed. That is to say, a main image M1-1 and degraded display images D1-2 and D1-3 of a scene 1 are displayed on a first row, a main image M2-1 and a degraded display image D2-2 of a scene 2 are displayed on the next row, and a main image M3-1 of a scene 3 is displayed on the subsequent row. In addition, the degraded display images D (dotted line images) obtained by subjecting the whole of the sub-image S to the color reduction are displayed. Of course, degraded display images D of other aspects may be displayed.

Figure 12B:
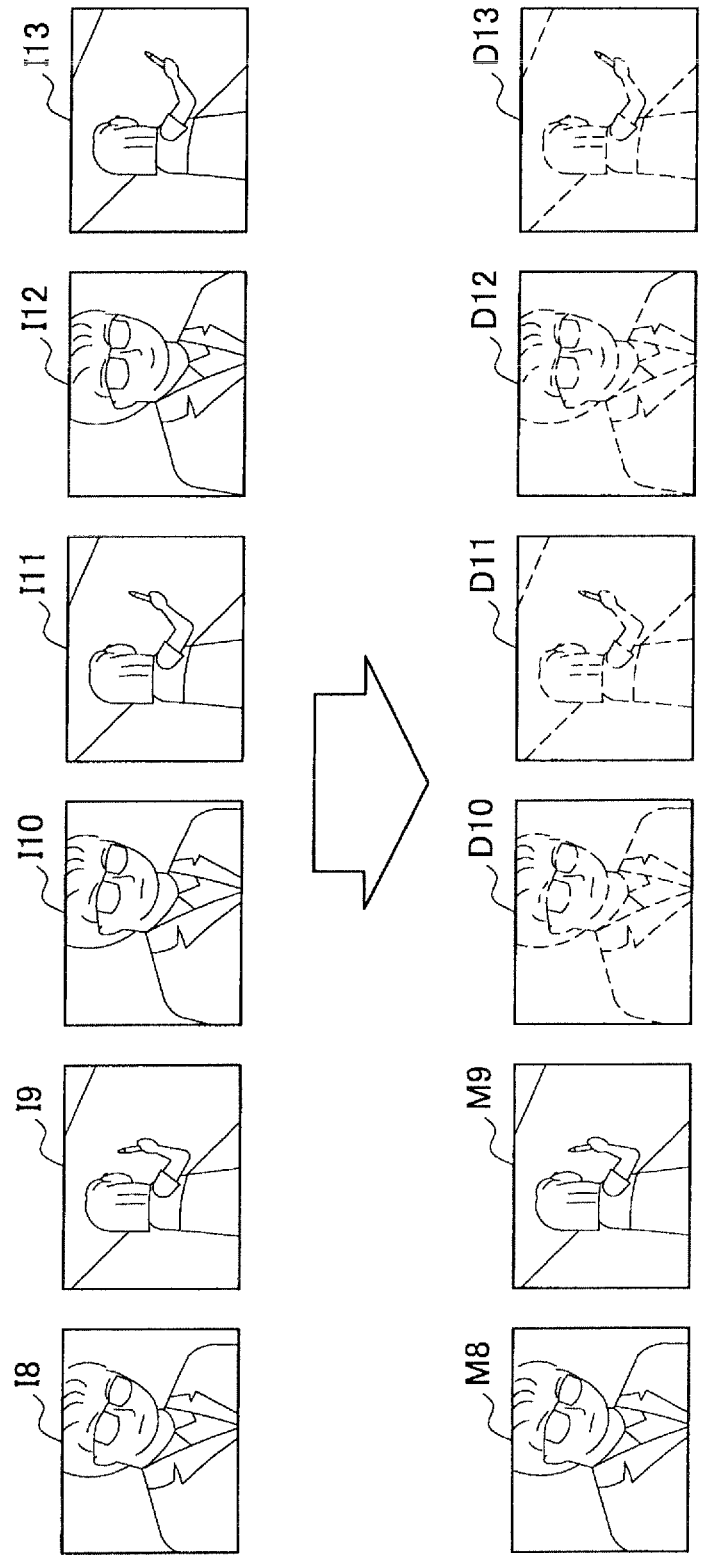
FIG. 12B is a diagram illustrating another example in which a sub-image is degraded and displayed by operating the whole of the sub-image.

FIG. 12B illustrates another example in which a sub-image S is degraded and displayed. The example illustrated in FIG. 12B is suitably adopted when predetermined scene pairs are repeated. In such a case, first, representative images I8 and I9 forming the initial scene pair are classified as main images M8 and M9 and representative images I10 to I13 forming the subsequent scene pairs are classified as sub-images S10 to S13 based on the scene pair ID described in the first embodiment. Then, degraded display images D10 to D13 forming scene pairs are generated by operating the sub-images S10 to S13 forming scene pairs, and are displayed together with the main images M8 and M9 forming scene pairs.

As described above, in accordance with the image processing apparatus and the image processing method according to the second embodiment of the present invention, the main images M and the degraded display images D are displayed, so that the display of the representative images I is not complicated and no loss of information such as a transition of a video occurs. Thus, a user of a video can overview a scene-cut video and easily understand the scene structure of a video.

[5. Third Embodiment (Degraded Display of Sub-Image by the Operation of Only Image Sa of Non-Change Area Included in Sub-Image)]

Next, an image processing apparatus according to a third embodiment of the present invention will be described with reference to FIGS. 13, 14, and 15A to 15E.

Figure 13:
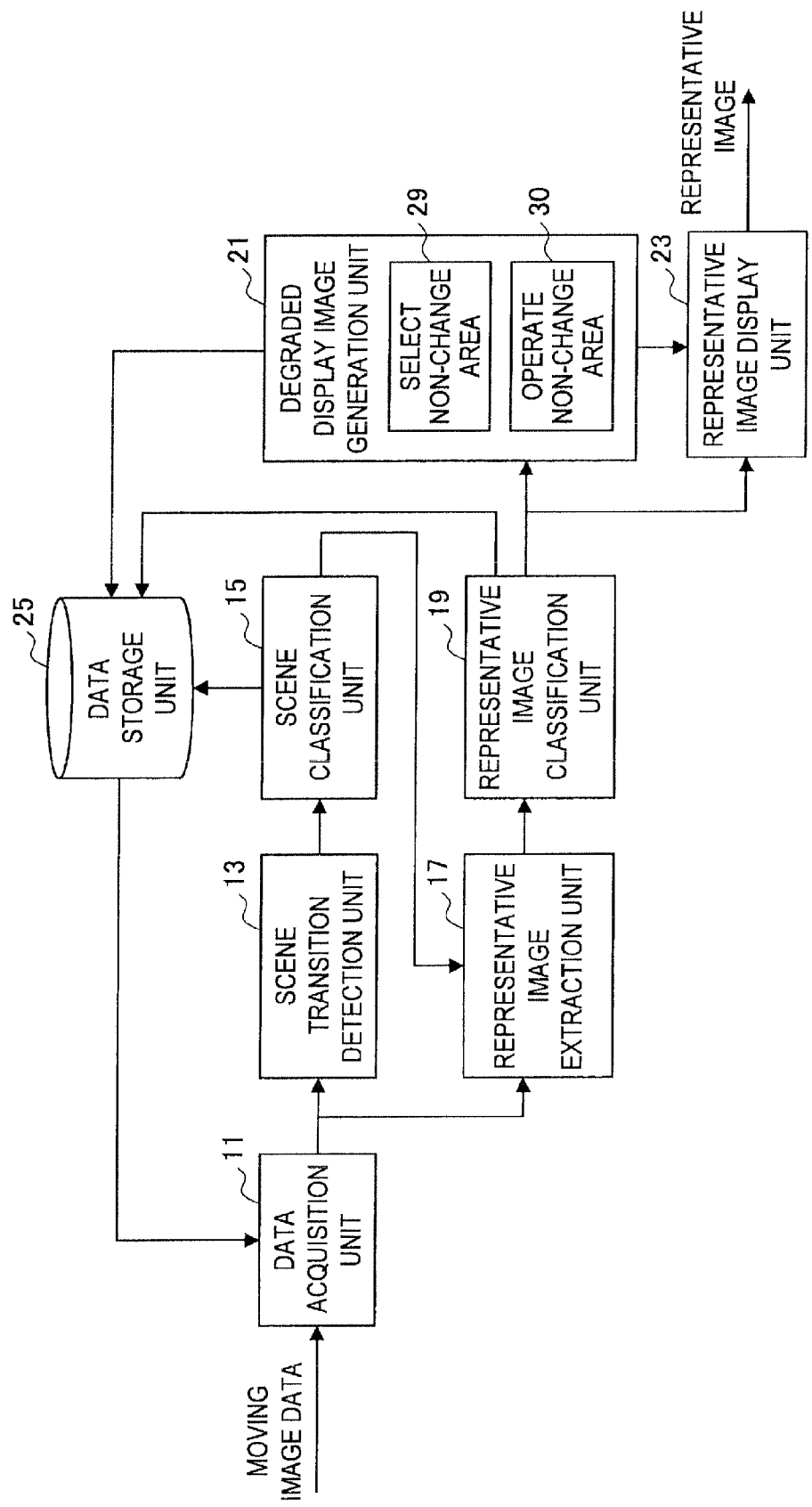
FIG. 13 is a block diagram illustrating a configuration of an image processing apparatus according to a third embodiment of the present invention.

As illustrated in FIG. 13, in the image processing apparatus according to the third embodiment, the degraded display image generation unit 21 generates a degraded display image D by operating only an image Sa of a non-change area included in a sub-image S.

The degraded display image generation unit 21 classifies the image area of the sub-image S into a change area and a non-change area (29), and performs an operation such as reduction, color reduction, lowering of a gray scale level, omission or cutting with respect to only the image Sa of the non-change area included in the sub-image S (30). In the image area of the sub-image S, the change area indicates an image area where image information changes above a predetermined threshold value between sub-images S in succession, and the non-change area indicates an image area where image information does not change above the predetermined threshold value between the sub-images S in succession.

The image area of the sub-image S is classified into the change area and the non-change area based on motion vectors of pixels included in the sub-image S. The motion vector is obtained by estimating pixels of a target image, which correspond to pixels of an image consecutive to the target image. The same estimation is performed for a plurality of images consecutive to the target image, so that motion vectors of each pixel can be obtained with high accuracy. A pixel with a motion vector of a predetermined threshold value or more is classified as a pixel constituting the change area, and a pixel with a motion vector of a predetermined threshold value or less is classified as a pixel constituting the non-change area.

Similarly to the image processing apparatus according to the second embodiment, when two or more representative images I are extracted from each scene, the image processing apparatus according to the third embodiment performs a process of displaying the representative images I of each scene such that a user can overview a scene-cut video. In the third embodiment, main images M of the representative images I are displayed and sub-images S of the representative images I are degraded and displayed by operating only the image Sa of the non-change area included in the sub-images S as described later.

Similarly to the second embodiment, in the third embodiment as well, first, the representative images I are extracted from a series of images belonging to each scene, and when two or more representative images I are extracted, the representative images I are classified into main images M and sub-images S. Next, when two or more representative images I are extracted from each scene, the image area of the sub-image S is classified into the change area and the non-change area, and a degraded display image D for degrading and displaying the sub-image S is generated by operating only the image Sa of the non-change area included in the sub-image S.

Then, representative images I of a plurality of scenes are displayed side by side in the scene transition sequence. In each scene, when two or more representative images I are extracted, both the main images M and the degraded display images D, in which the image Sa of the non-change area included in the sub-image S is degraded and displayed, are displayed, and when one representative image I is extracted, the representative image I is displayed as the main image M.

Figure 14:
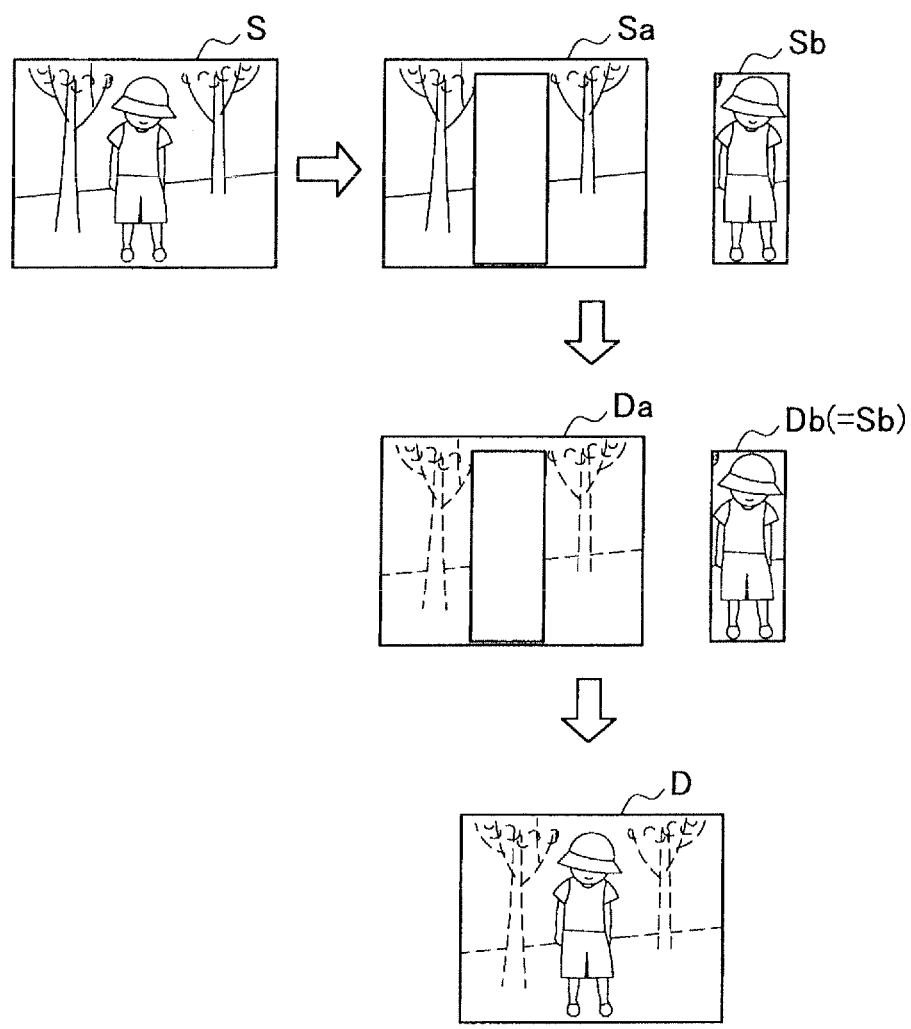
FIG. 14 is a diagram illustrating an example in which a sub-image is degraded and displayed by operating only an image of a non-change area.

FIG. 14 illustrates the overview of a method for operating only the image Sa of the non-change area included in the sub-image S. As illustrated in FIG. 14, first, the image Sa (Sa is a general term for images of the non-change area included in the sub-image S) of the non-change area and an image Sb (Sb is a general term for images of the change area included in the sub-image S) of the change area are extracted from the sub-image S based on motion vectors of pixels included in the sub-image S. In addition, in the following example including FIG. 14, the change area is extracted as an area having a rectangular shape. However, the change area may be extracted as areas having shapes other than the rectangular shape. Then, an image Da (Da is a general term for images of the non-change area included in the degraded display image D) of the non-change area, which has been obtained by operating the image Sa of the non-change area, is generated and synthesized with an image Db (Db is a general term for images of the change area included in the degraded display image D) of the change area, thereby generating the degraded display image D obtained by operating only the image Sa of the non-change area.

FIGS. 15A to 15E illustrate examples in which a sub-image S is degraded and displayed by operating only the image Sa of the non-change area. In the examples illustrated in FIGS. 15A to 15E, among the representative images I1-1, I1-2, I1-3, I2-1, I2-2 and I3-1 of the scenes 1 to 3 illustrated in FIG. 8, the representative images I1-1, I2-1 and I3-1 are displayed as main images M1-1, M2-1 and M3-1, and the representative images I1-2, I1-3 and I2-2 are displayed as degraded display images D1-2, D1-3 and D2-2. In addition, in FIGS. 15A, 15B, 15C and 15E, a boundary line is drawn between the non-change area and the change area in order to distinguish the image Sa of the non-change area from the image Sb of the change area. However, when displaying the sub-image S, the display of the boundary line is omitted.

Figure 15A:
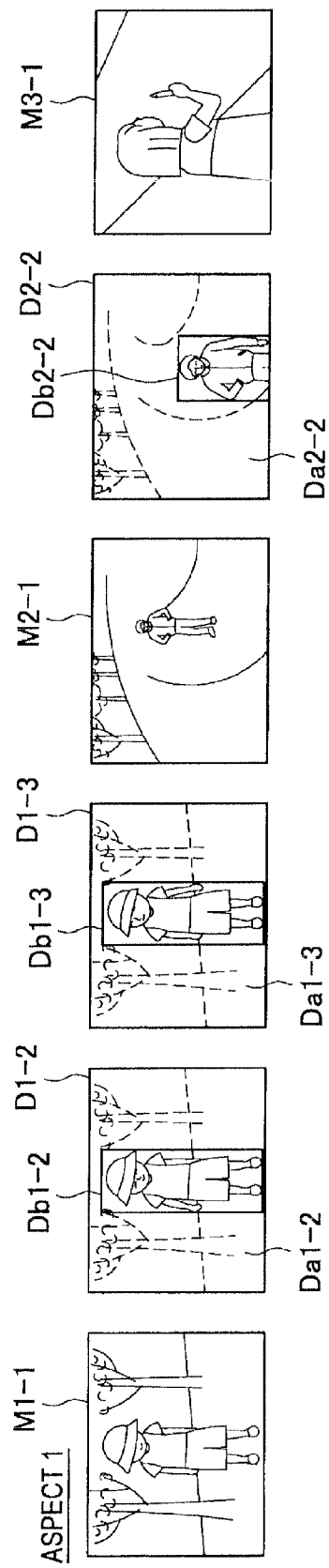
FIG. 15A is a diagram illustrating an aspect 1 in which a sub-image is degraded and displayed by operating only an image of a non-change area.

In an aspect 1 illustrated in FIG. 15A, the number of colors of the image Sa of the non-change area is reduced (the image Sa is expressed with a reduced number of colors), so that the sub-image S is degraded and displayed. The degraded display image D includes an operated image Da of the non-change area and a non-operated image Db of the change area. In such a case, the image Da of the non-change area may be expressed with black and white, or a sepia color and the like. In addition, in FIG. 15A, for the convenience of display, images with a reduced number of colors are indicated by dotted line images.

Figure 15B:
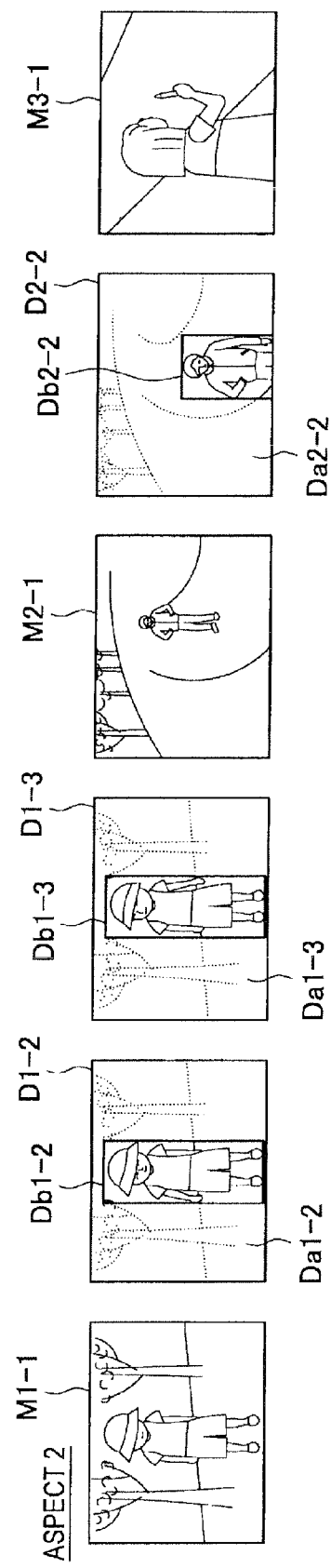
FIG. 15B is a diagram illustrating an aspect 2 in which a sub-image is degraded and displayed by operating only an image of a non-change area.

In an aspect 2 illustrated in FIG. 15B, the degraded display images D are generated by lowering the gray scale level of the image Sa of the non-change area, so that the sub-image S is degraded and displayed. The degraded display image D includes an operated image Da of the non-change area and a non-operated image Db of the change area. In such a case, the image Da of the non-change area may be expressed with a gray scale lower than that of the change area by darkly expressing image information, lightly expressing the image information, or expressing the image information with lowered contrast. In addition, in FIG. 15B, for the convenience of display, images with reduced gray scale are indicated by dotted line images.

In an aspect 3 illustrated in FIG. 15C, the image Sa of the non-change area is omitted, so that the sub-image S is degraded and displayed. Each degraded display image D includes a void image Da corresponding to the non-change area Sa and a non-operated image Db of the change area. In such a case, in the sub-image S, the image Sa of the non-change area is made void. However, the sub-image S is displayed with the same size as the main image M.

In an aspect 4 illustrated in FIG. 15D, the image Sa of the change area is cut, so that the sub-image S is degraded and displayed. In such a case, the sub-image S is displayed with a size smaller than that of the main image M. Each degraded display image D includes only a non-operated image Db of the change area.

In an aspect 5 illustrated in FIG. 15E, the number of colors of the image Sa of the non-change area is reduced or the gray scale level of the image Sa of the non-change area is lowered and an image including the change area and a part of the non-change area surrounding the change area is cut, so that the sub-image S is degraded and displayed. Each degraded display image D includes an operated image Da forming an image of the non-change area, a part of which surrounds the change area, and a non-operated image Db of the change area. In such a case, the sub-image S is displayed with a large size as compared with the aspect 4, but is displayed with a size smaller than that of the main image M.

Furthermore, in the third embodiment as well, the degraded display image D, for example, may be generated by appropriately combining the aspects 1 to 5 with one another such as combination of color reduction and lowering of a gray scale level of the image Sa of the non-change area. The degraded display image D may be generated by performing the lowering of a resolution, line drawing, gradation and the like for the sub-image Sa of the non-change area. In addition, among a plurality of sub-images S, the number of colors to be reduced may be changed, or a gray scale to be lowered may be changed step by step, for example, according to a frame sequence, priorities and the like. Furthermore, as described with reference to FIG. 12A, the representative images I of each scene may be subject to line feed for each scene and displayed, and as described with reference to FIG. 12B, the representative images I forming the initial scene pair may be displayed as main images M and the representative images I forming the subsequent scene pairs may be displayed as degraded display images D.

As described above, in accordance with the image processing apparatus and the image processing method according to the third embodiment of the present invention, the main images M and the degraded display images D, which are obtained by operating only the image Sa of the non-change area included in the sub-image S, are displayed, so that information such as a transition of a video is displayed with emphasis. Thus, a user of a video can overview a scene-cut video while referring to the transition of the video and easily understand the scene structure of the video.

It should be understood by those skilled in the art that various modifications, combinations, sub-combinations and alterations may occur depending on design requirements and other factors insofar as they are within the scope of the appended claims or the equivalents thereof.

For example, in the above description, the case where representative images of a plurality of scenes are displayed side by side in a lateral direction in the scene transition sequence has been described. However, the representative images may be displayed side by side in a constant direction such as a longitudinal direction or an inclined direction.

The present application contains subject matter related to that disclosed in Japanese Priority Patent Application JP 2010-126020 filed in the Japan Patent Office on Jun. 1, 2010, the entire content of which is hereby incorporated by reference.

What is claimed is:

1. An image processing apparatus comprising:
   a scene transition detection unit for detecting a scene transition in a moving image based on data of the moving image including a series of images;
   a representative image extraction unit for extracting a predetermined number of representative images from a series of images belonging to each scene;
   a representative image classification unit for, when two or more representative images are extracted from each scene, classifying the representative images into a main image and a sub-image;
   a degraded display image generation unit for generating a degraded display image by operating the sub-image in order to degrade and display the sub-image; and
   a representative image display unit for displaying the representative images of a plurality of scenes side by side in a scene transition sequence, and displaying the main image and the degraded display image when two or more representative images are extracted from each scene and the representative image when one representative image is extracted from each scene.

2. The image processing apparatus according to claim 1, wherein the degraded display image generation unit classifies an image area of the sub-image into a change area and a non-change area, and generates the degraded display image by operating only an image of the non-change area included in the sub-image.

3. The image processing apparatus according to claim 2, wherein the degraded display image is generated by reducing a number of colors of the image of the non-change area included in the sub-image.

4. The image processing apparatus according to claim 2, wherein the degraded display image is generated by lowering a gray scale level of the image of the non-change area included in the sub-image.

5. The image processing apparatus according to claim 2, wherein the degraded display image is generated by omitting the image of the non-change area included in the sub-image.

6. The image processing apparatus according to claim 2, wherein the degraded display image is generated by cutting only an image of the change area included in the sub-image.

7. The image processing apparatus according to claim 2, wherein the degraded display image is generated by reducing a number of colors or lowering a gray scale level of the image of the non-change area included in the sub-image, and cutting images of the change area and a part of the non-change area surrounding the change area.

8. The image processing apparatus according to claim 1, wherein the degraded display image is generated by reducing a whole of the sub-image.

9. The image processing apparatus according to claim 1, wherein the degraded display image is generated by reducing a number of colors of a whole of the sub-image.

10. The image processing apparatus according to claim 1, wherein the degraded display image is generated by lowering a gray scale level of a whole of the sub-image.

11. The image processing apparatus according to claim 1, wherein the representative image extraction unit extracts a predetermined number of representative images corresponding to lengths of each scene.

12. The image processing apparatus according to claim 1, wherein the representative images of the plurality of scenes are displayed side by side in the scene transition sequence, on a new line for each scene.

13. The image processing apparatus according to claim 1, further comprising:
   a scene classification unit for classifying the plurality of scenes as scene groups based on feature amounts of the representative images of each scene.

14. The image processing apparatus according to claim 13, wherein the scene classification unit classifies the plurality of scenes as scene pairs with predetermined continuity based on a classification result of the scene groups.

15. The image processing apparatus according to claim 13, wherein information indicating the scene groups is stored as attribution information of the representative image of each scene in association with the data of the moving image.

16. The image processing apparatus according to claim 14, wherein information indicating the scene pairs is stored as attribution information of the representative image of each scene in association with the data of the moving image.

17. An image processing method comprising the steps of:
   detecting a scene transition in a moving image based on data of the moving image including a series of images;
   extracting a predetermined number of representative images from a series of images belonging to each scene;

when two or more representative images are extracted from each scene, classifying the representative images into a main image and a sub-image;

generating a degraded display image by operating the sub-image in order to degrade and display the sub-image; and displaying the representative images of a plurality of scenes side by side in a scene transition sequence, and displaying the main image and the degraded display image when two or more representative images are extracted from each scene and the representative image when one representative image is extracted from each scene.

18. A program stored on a non-transitory computer readable medium for causing a computer to execute the steps of:

detecting a scene transition in a moving image based on data of the moving image including a series of images;

extracting a predetermined number of representative images from a series of images belonging to each scene;

when two or more representative images are extracted from each scene, classifying the representative images into a main image and a sub-image;

generating a degraded display image by operating the sub-image in order to degrade and display the sub-image; and displaying the representative images of a plurality of scenes side by side in a scene transition sequence, and displaying the main image and the degraded display image when two or more representative images are extracted from each scene and the representative image when one representative image is extracted from each scene.

* * * * *